United States Patent

Collins et al.

[15] 3,662,401

[45] May 9, 1972

[54] METHOD OF PROGRAM EXECUTION

[72] Inventors: Arthur A. Collins; Wesley B. Henry, both of Richardson, Tex.

[73] Assignee: Collins Radio Company, Dallas, Tex.

[22] Filed: Sept. 23, 1970

[21] Appl. No.: 74,723

[52] U.S. Cl. ....................444/1
[51] Int. Cl. ....................G06f 9/06
[58] Field of Search ....................340/172.5; 444/1

[56] References Cited

UNITED STATES PATENTS 3,496,551 2/1970 Driscoll et al. ....................340/172.5
3,530,438 9/1970 Mellen et al. ....................340/172.5

*Primary Examiner*—Raulfe B. Zache
*Attorney*—Henry K. Woodward and Robert J. Crawford

[57] ABSTRACT

A method of activity implementation through use of automatic computation means whereby simultaneous execution of program tasks may be performed and maximum utilization of system facilities is realized. The overall activity is partitioned into separate tasks with input requirements, desired outputs, and execution priority specified for each task. As tasks receive ready status, they are assigned to appropriate system work stations for implementation. Each task is defined by a program control instruction and may include a plurality of sub-tasks which are performed within the system.

10 Claims, 12 Drawing Figures

INVENTORS.
ARTHUR A. COLLINS
WESLEY B. HENRY

BY H. K. Woodward

ATTORNEY

| PCI NAME | INPUT | OUTPUT | E LIST | COUNT |
|---|---|---|---|---|
| A | F1 | F2 | B, C | 1 |
| B | F2 | F3 | D | 1 |
| C | F2, F9 | F4 | D | 1 |
| D | F3, F4 | F5 | E | 2 |
| E | F4, F5 | F6 | LAST | 1 |

| PCI CONTROL | PROGRAM IDENTIFICATION | OUTPUT | INPUT PARAMETER LIST | EXECUTE LIST | SPACE RELEASE LIST |
|---|---|---|---|---|---|

INVENTORS.
ARTHUR A. COLLINS
WESLEY B. HENRY
BY H. K. Woodward
ATTORNEY

INVENTORS.
ARTHUR A. COLLINS
WESLEY B. HENRY
BY H. K. Woodward
ATTORNEY

INVENTORS.
ARTHUR A. COLLINS
WESLEY B. HENRY

BY H. K. Woodward
ATTORNEY

METHOD OF PROGRAM EXECUTION

This invention relates to automatic computing means, and more particularly to a method of executing an activity in the form of a directed action network in an automatic computing system comprising a plurality of processor means and/or work stations.

Modern enterprise must organize its work in an efficient and orderly manner to insure that all objectives are reached in timely fashion, and that resources are utilized to the maximum. A common technique employed in work organization, and one which lends itself to efficient implementation, is based upon the partitioning of the overall activity into separate, well-defined, manageable tasks. As used herein, the term "activity" includes any business function such as, for example, financial record keeping, budgetary control, personnel records and payroll, manufacturing and production control, and the like where the business function entails a plurality of tasks which may be performed sequentially and/or concurrently. Such business functions will inherently require communication of data and coordination among the various tasks.

However, most present-day computers are not well suited to aid management directly in the control of directed action networks i.e. coordinated arrangements of the tasks of a business function or activity. Applications are separately defined and implemented and are run independently. Interconnection between applications is performed manually, and parallel execution of interrelated jobs is often impractical. In such computers it is necessary to limit activity separation to relatively grossly defined tasks, because of the limitations of existing computers and software.

Further, the quantity of work to be done often exceeds the capacity of a single computer, and each organizational and geographical unit of an enterprise requires its own computer which is dedicated to the fulfillment of its assigned role. Frequently, work is also separated by class such as scientific, accounting, and direct digital control. This duplication of computing power, by function and by geographic location, introduces many problems in communication and central management control, as well as being inefficient in computer utilization.

Collins Radio Company, assignee of the present application, has introduced a revolutionary new computer system which overcomes many of the limitations and difficulties of conventional computer systems. Designated the C-System, the Collins computer network includes one or more processors and a switched communication network which interconnects the processors and all equipments thereby giving all processors full access to the total data storage facility of the system including all attached disc files and associated tape libraries.

The present invention entails a method of activity implementation which allows a single processor or a multi-processor network such as the C-System to combine communication and processing functions thereby providing for the interconnection of equipments, functions, programs, and facilities into an integrated operating system which allows simultaneous execution of program tasks. The control program mode of system operation, in accordance with the present invention, defines, dispatches, and manages the work flow in the multi-work-station network. Procedures employed in this mode of operation involve partitioning the overall activity into separate, well-defined, and manageable tasks with input requirements and desired outputs specified for each task. Each task to be performed is specified by an instruction within the control program and may be dispatched to any suitable work station, such as processors, numerically controlled tools, input-output devices, and the like. The switched communication network which interconnects the C-System allows work to be dispatched to and executed by any available and suitable facility concurrently with the execution of other tasks at other work stations. Each process center may have a load dispatch table with a list of system facility addresses used by the software to dispatch each task. Load regulator means may be employed cooperatively with the load dispatch table to equalize the loads at functionally equivalent work stations. As tasks are implemented subsequent, dependent tasks are decremented in time order until all required inputs are available at which time these tasks are dispatched for execution.

Accordingly, an object of the present invention is a method of implementing a programmable activity in a computer controlled network.

Another object of the invention is a method of executing a directed action program through use of automatic communication, computation, and control means.

Yet another object of the invention is a method of computer controlled implementation of a multi-task program wherein a plurality of tasks may be executed concurrently.

These and other objects and features of the invention will be more fully understood from the following detailed description and appended claims when taken with the drawings, in which:

FIGS. 8a–8e illustrate implementation of the control program of FIG. 3 in the multi-processor computer system illustrated in FIG. 1.

Prior to describing the control program mode of system operation, a brief description will be given of a C-System communication and computation network in which the control program mode of operation, in accordance with the present invention, is especially applicable.

Figure 1:
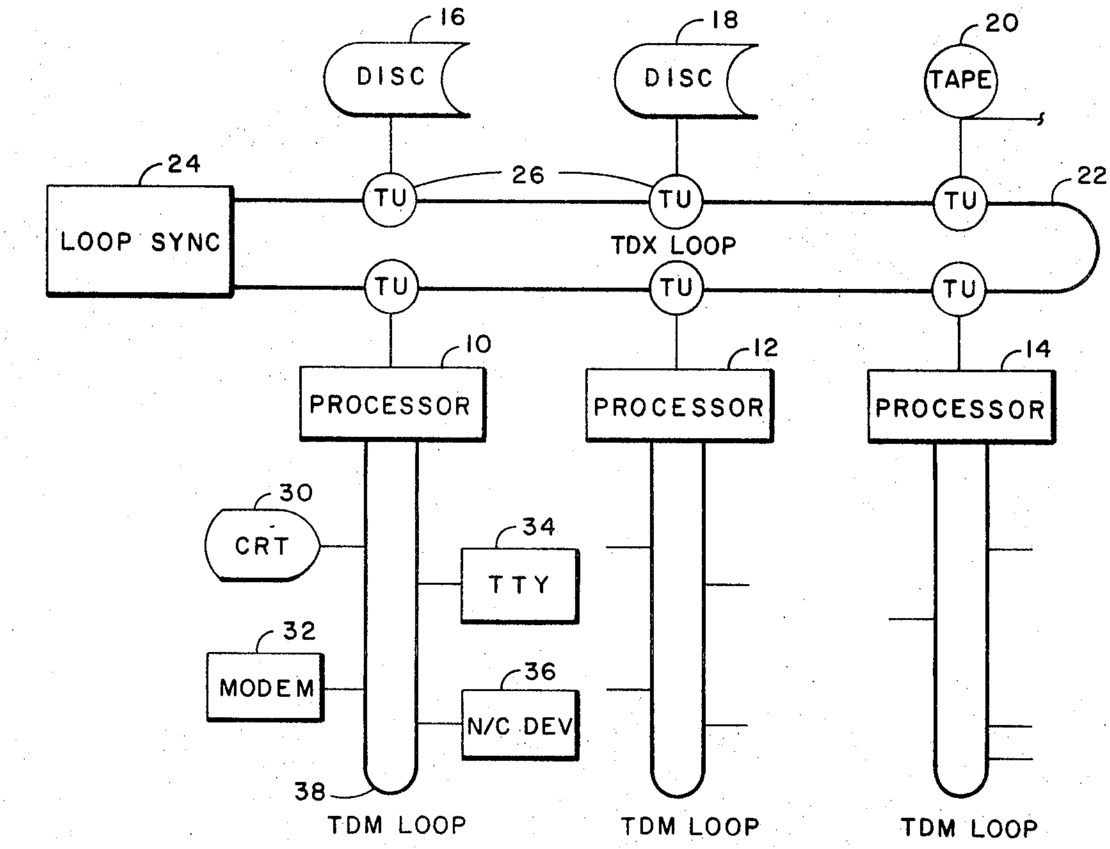
FIG. 1 is a functional block diagram of a multi-processor computer system having a common multiplex communication channel and in which the present invention is applicable.

Referring to FIG. 1, in this embodiment the system comprises three processors 10, 12, and 14, two disc files 16 and 18, and a magnetic tape unit 20. These devices are interconnected by a time division exchange (TDX) loop 22 which provides a communication link between the devices. A loop synchronizer 24 provides the basic timing for the loop and generates synchronizing pulses so that the various devices can recognize their channels and interchange data. A serial bit data stream from the time division exchange loop is accepted by the loop synchronizer which temporarily stores, amplifies, and resynchronizes the data. The loop synchronizer then sends the data out over the loop in a serial fashion without altering its logical content. The loop synchronizer is disclosed in co-pending application serial No. 61,559, filed Aug. 6, 1970, also assigned to the present assignee.

In one implementation the speed of the time division exchange loop is 32 million bits per second (MBPS) which enables 16 multiplex channels to operate at 2 MBPS each. Since only one channel is required for a processor to communicate with another device, in this implementation the TDX loop enables 16 communications to be handled simultaneously. Suitable terminal units 26 interconnect the devices to the loop. The basic function of each terminal unit is to recognize the synchronizing pulse, count time to locate a specific channel, and extract from the loop only that data assigned for use by its device.

Connected with each processor may be a number of low speed devices such as a CRT display 30, a data modem 32, a teletypewriter equipment 34, and a numerically controlled device 36. The low speed devices are interconnected with the processor by means of a time division multiplex (TDM) loop 38 which in the specific embodiment operates at a speed of 1.2288 MBPS. The TDM loop operation is described in co-pending application Ser. No. 741,966, filed July 2, 1968, and assigned to the present assignee, now Pat. No. 3,544,976. Briefly, the TDM loop is driven by a multiplex service unit within the processor and uses a similar technique of time division addressing as that used by the time division exchange loop. Any device connected to the time division multiplex loop is dedicated to one processor, i.e., communication with that device can be carried out by only one specific processor. Each of the low speed devices is connected to the TDM loop through a multiplex device coupler or similar device which operates similar to a terminal unit on the TDX loop. The multiplex device coupler recognizes the synchronizing pulse generated within a processor so that it can identify a channel or time slot used by a device connected to the TDM loop.

Operation of the computer controlled network in accordance with the present invention is implemented through means of a control program which comprises a list of program control instructions and input data. Each program control instruction represents one task to be executed and contains the information necessary to initiate execution of the task, to record completion of the execution of the task, and to update logical connections to other program control instructions in the control program. Each task may include a plurality of subtasks which may include service programs, application programs, or other control programs.

Figure 2:
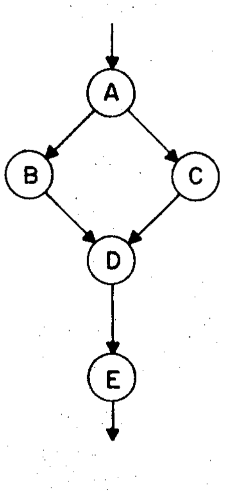
FIG. 2 is a directed graph representation of a multi-task activity.

Consider now an operation comprising a plurality of task executions illustrated by the directed graph in FIG. 2. The nodes in the directed graph labeled A, B, C, D, and E represent tasks or application programs, and the graph depicts the interrelationship between these tasks and the sequence in which the tasks must be executed. FIG. 2 shows that task A must begin first, and since both task B and task C are dependent on task A, they can be executed only after task A is completed. Both task B and task C, however, can be executed in parallel because they are not dependent on each other. Task D on the other hand cannot be executed until both tasks B and C are completed as task D depends on both of them for inputs, and finally task E can be executed only after the other four tasks have been completed.

Figure 3:
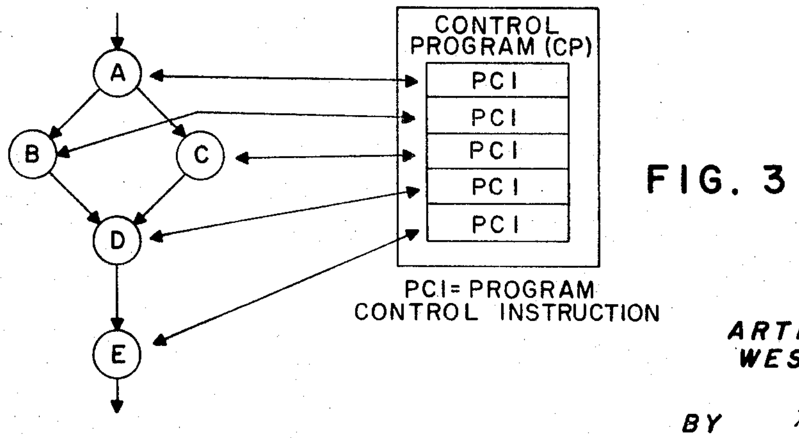
FIG. 3 is a control program representation for implementing the activity of FIG. 2.

FIG. 3 illustrates how a control program in accordance with the present invention implements this operation. Briefly, the control program consists of task instructions known as program control instructions (PCI). A program control instruction essentially identifies all of the necessary information about the particular task or application program, such as its name, required inputs, desired outputs, and other tasks it affects. In this manner, a collection of program control instructions defines an entire program system. If this collection of program control instructions is interpreted by the operating system in the form of a control program, the system is directed as to the sequence of task performance and the interrelationships of these tasks.

Figures 4, 5, 6:
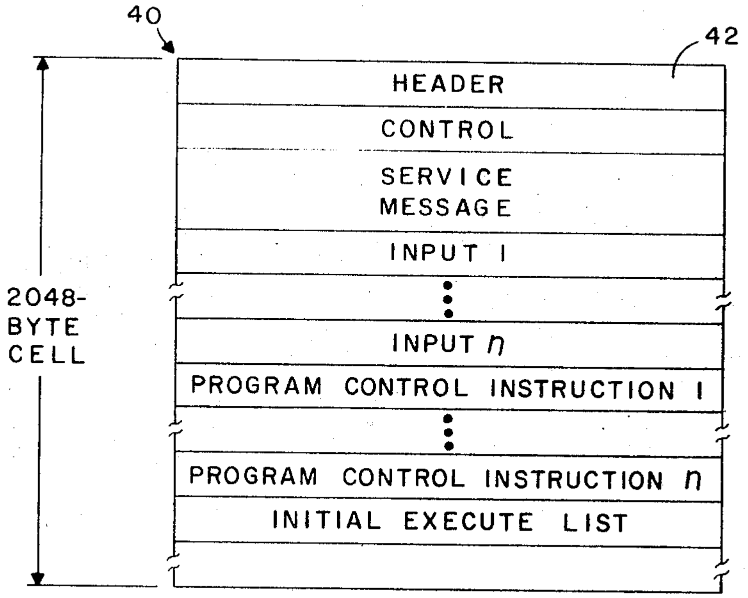
FIG. 4 is a table of contents for the program control instruction of the control program of FIG. 3.
FIG. 5 is the format of a control program as it may be stored as a single-cell file on disc storage.
FIG. 6 is the format of a program control instruction.

Referring to FIG. 4, the five program control instructions include the name of each program (programs A, B, C, D, and E), required inputs, outputs, execution list (E list), and a time-order count. Program A has an input file 1 (F1) and generates an output file 2 (F2). Program A affects the running of the programs B and C, as shown on the directed graph of FIG. 2, thus, the E list for the first program control instruction points to programs B and C. The count field specifies a number of input controls required by each program control instruction. In the case of task A, a simple start function specifies the initial control to run program A. Note that in the control program example both program B and program C affect the running of program D so that the execution list points to D for both program control instructions of application programs B and C. Because program B receives input control from program A, its count field is 1. Likewise, since C receives an input control from A, its count is 1. However, because D receives input counts from B and C, its count field is 2, and the E list of program D points to program E. Each time a program is executed, the program control instructions are updated and the count fields are reduced. When program B is completed, the count of program D is reduced to 1; and when program C is completed, the count of 1 is reduced to 0, indicating that program D can be executed by same processor.

It should be pointed out that the input files for any given application or service program may include whatever data is required and do not necessarily relate exactly to the lines of control on the directed graph. The lines of control on the directed graph are directly related to the execution list within the control program. Note, for example, that program B uses an output from program A as an input file, and, in turn, generates an output called file 3 (F3). Program C on the other hand uses not only file 2 as input that has been output from program A, but also file 9 which is not an output of this control program in any of the program control instructions. Thus, an additional, external input file is being used by program C. Likewise, program E uses both an output from program C and an output from program D although its controlling input comes strictly from program D as shown in the execution list of FIG. 4. Therefore, input files may come from other steps within a given control program or from outside of the control program, and input files do not necessarily relate directly to the lines of control in the directed graph.

The control program may be stored on disc storage as a single cell file, referred to as a control program status record (CPSR). FIG. 5 illustrates a format of such a record. The 2048 byte cell includes a plurality of fields 42. The header field contains the system assigned identifier and other parameters as may be required by the system standard file structure. The control field contains the location of the first program control instruction to be executed, the location of the initial execute list, and the status information concerning the state of the control program status record. If this control program has been called by a program control instruction within another control program, the service message field contains the system address of the calling program control instruction. Upon completion of the called control program, a program return service message is sent to this address.

The input fields may be used to specify literal data or the system address of data files required to execute this particular control program. The data files referenced are stored on discs and are directly accessible via the communication system. The program control instruction fields contain the list of programs and a logical structure of program execution required by the program system. The initial execute list field contains the list of program control instructions that must be initialized to begin execution of the control program.

The control program status record contains the current completion status of all activity associated with a program system and the physical location of all associated data files. This status provides checkpoint levels during the execution of the program system. The control program status record may be released when the control program is completed, or it may be retained and reactiviated for subsequent execution. The system user may thus structure the control programs to maintain the required historical files or backup levels suitable for his program system.

A program control instruction is used to call a program for execution. The program identification, input requirements, logical interconnections with other programs, and control information are included in the program control instruction. The called program is executed and builds a single output file, and the address of this output file is placed in the program control instruction after the program is completed.

The program control instruction contains 6 fields as shown in FIG. 6. These fields are called PCI control, program identification, output, input parameter list, execute parameter list, and space release list.

The PCI control field contains status information and pointers to other fields in the program control instruction. This information includes the number of external inputs required by this PCI, the number of external inputs not yet available, type of message to be initiated when all external inputs are available, routing parameters, start time of the PCI (time when all external inputs become available), processor address controlling execution of the control program, maximum run time, type of storage required for the output file of PCI, pointer to the next PCI, and any other control instructions.

The program identification field contains information necessary to locate the program called by the program control instruction. This field may contain the disc storage address of the program or may contain the identification of a system service function. If the program identification field contains a system service function identification, the physical address of the program is obtained at the time the program is loaded for execution.

The output field contains the disc address of the output file generated by the execution of the program specified in the program identification field or, in some cases, may contain literal data. This field is updated when a service message is received by control program service, indicating completion of the called program. Control program service is a software module available to and executable in any processor. This software program interprets program control instructions, initiates construction of service messages directing the execution of a task, and updates the status of the control program as tasks are completed.

The input parameter list consists of two parts. One part contains pointers which locate each of the input parameters in the control program status record; the other part contains either literal data or locations for the addresses of files required as input data for the program called by the program control instructions. When the external input count of the program control instruction reaches zero, control program service uses the pointers to locate data in the control program status record and moves this data into reserved locations in the input parameter list.

The execute parameter list includes a count of the number of pointers in the execute list and a list of pointers to program control instructions in the control program. When the program control instruction is completed, control program service uses the list of pointers to decrement the external input count in each referenced program control instruction. When a count reaches zero in any program control instruction, its inputs are resolved, and control program service issues a service message dispatching this task to a processor for execution.

The release parameter list contains a count of the number of parameters in the list and a list of the pointers to file addresses within the control program. Upon completion of the program called by the program control instruction, control program service generates space released service messages for all files referenced in the release parameter file of the program control instruction.

Figure 7:
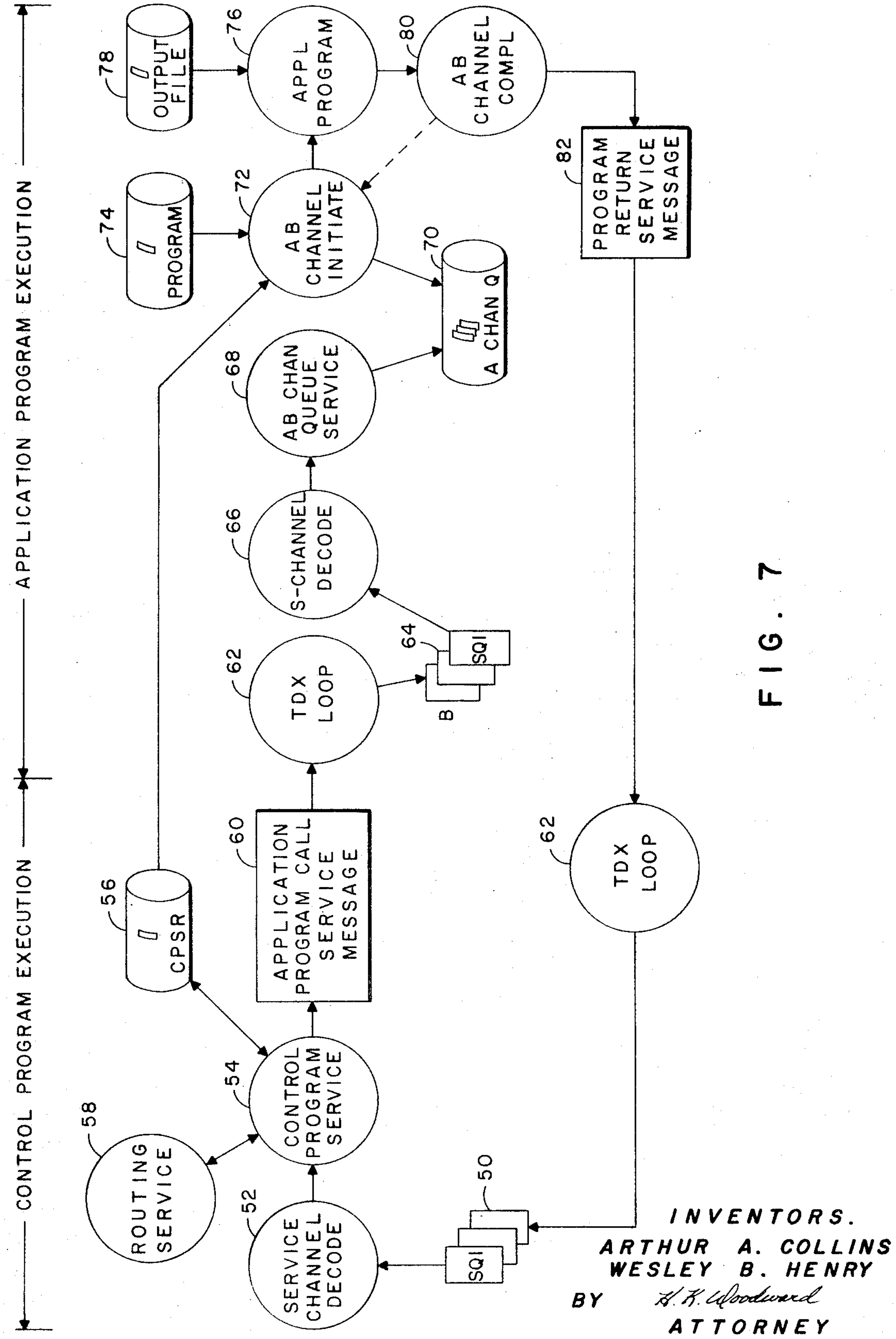
FIG. 7 is an illustration of the execution of control program instruction in a computer system.

The execution of a control program involves the selection, initiation, and completion of program control instructions. Consider now the execution of a program control instruction which calls for an application program. FIG. 7 illustrates a path through an operating system for the execution of an application program. Entries in the processor service channel work queue 50 are read in sequence by service channel decode 52, which is a resident program that decodes the operation code of the service message and directs it to the appropriate service function. In this example, the service message is sent to control program service 54, which examines the message for the control program status record being called. Control program service 54 then reads the control program status record 56 from disc and locates the program control instruction referenced by the service message. The completing program control instruction which is referenced contains pointers to additional program control instructions whose input counts will be decremented by one.

Any program control instruction whose input count has reached zero will be initiated by the control program service 54. Control program service provides information on the locations of required input data and obtains the address of a suitable facility for executing the application program from a load dispatch table contained in a common resident function called routing service 58. Control program service 54 then builds an application program call service message 60 and directs it to the processor or work station specified by routing service 58. The called processor, for example, receives the service message via the multiplex communication channel in the TDX loop 62, and input program means resident in that channel decodes the operation code of the service message and places it in the service channel work queue 64. It will be noted that the service message may be directed to any available processor or work station in the system. Service channel decode 66, examines the service channel work queue and determines which service function is required to execute the service message. In this example, the application program service message is acted upon by AB channel queue service 68, which determines the channel A or B in the two channel processor to which the service message is to be directed and enters it in the appropriate queue on disc 70. When the entry is next in sequence for execution, the AB channel initiate function 72 receives the service message from queue, reads the control program status record from disc 56, and locates the calling program control instruction. The program control instruction specifies the program to be executed and the data files to be used as inputs. The called program 74 is loaded into core and control is transferred to the application program 76, which, when executed, typically produces an output file 78. When the application program is complete, control is assumed by a common resident function called AB channel completion 80, which builds a program return service message 82 containing the address of the output file produced.

AB channel completion 80 builds the return service message 82, transmits the return service message via the multiplex communication channel in the TDX loop 62 to the processor maintaining the control program and transfers control back to the AB channel initiate function for execution of the next entry in the A channel queue.

The communication channel input program queues the program return service message 82 in the service channel queue of the receiving processor. When control program service 54 processes this program return service message, the address of the output file created by execution of the program called by the program control instruction is placed in CPSR 56, the input count of each referenced program control instruction is decremented by one, and any space release messages required are generated. If any program control instruction counts in the CPSR have gone to zero, service messages are generated to dispatch the requested work.

Control programs are stored on secondary storage and brought into processor core to be executed. Every processor in the center may execute the software module known as control program service. Control program service brings a control program into core and interprets the program control instructions, as above described. As the program control instructions are interpreted, control program service initiates the construction of a service message to direct the execution of the job to one of the processors or other work stations in the system.

There are several types of service messages, including one that calls an application program and another that calls a control program. The latter is used in the case of nested control programs which are explained in the following paragraphs. When a service message calls for a task to be executed, it identifies the location of that task on storage so that the designated receiving processor knows where to find that job. As described above, service messages are sent over the system communication channel, queued in a receiving processor, and later decoded and executed.

The control program illustrated in FIG. 3 is one in which each program control instruction identifies an application program. However, a program control instruction may identify another control program which, in turn, identifies a set of application programs. It is also possible for a mixture of program control instructions to exist in which some call on control programs and others call on application programs. When control programs are to be run in the system, there must be inputs which are required to initiate the control program and outputs from the control program. Thus, the standard format definition of a program control instruction applies to either a control program or an application program, where inputs and outputs are concerned. Somewhere in the network the end result must be identification of application programs to run or a call to some system software module.

Figure 8A:
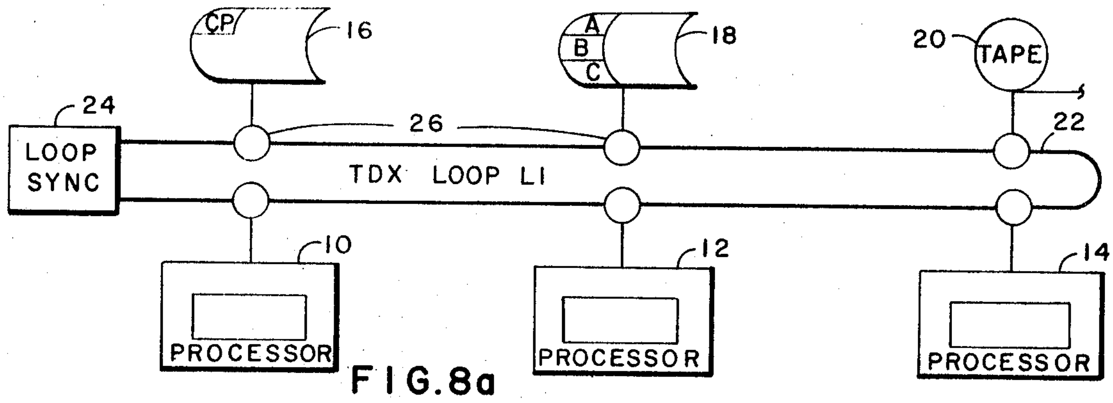
Figure 8B:
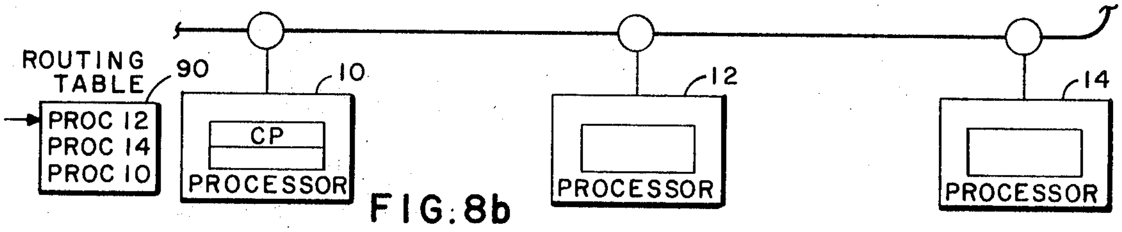
Figure 8C:
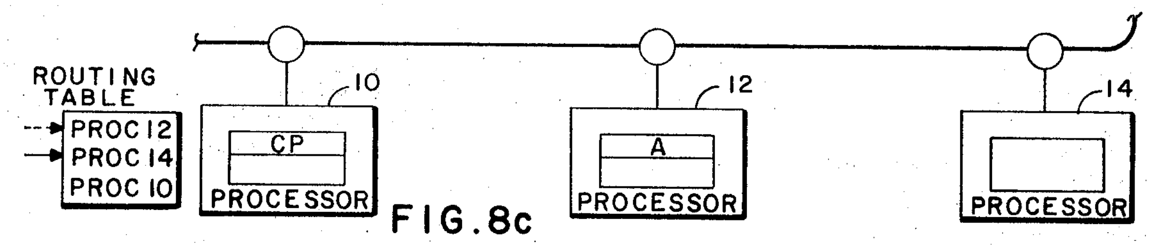
Figure 8A:
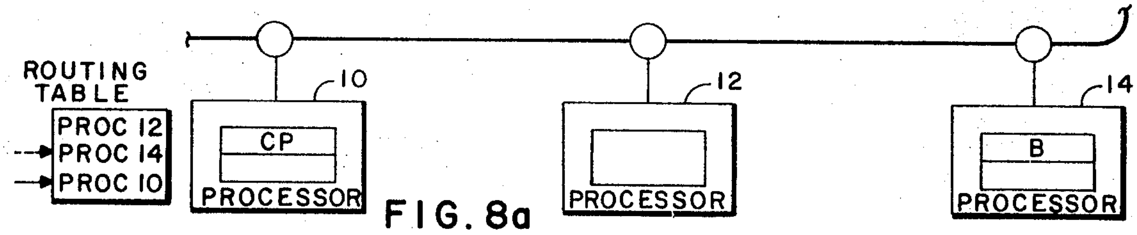

Consider now an example which describes the execution of the control program shown in FIG. 3 using the system shown in FIG. 1. Assume the control program is defining five application programs to be run through the program control instruction list. For ease of explanation, the example has been simplified and not all of the specific details are included. FIG. 8*a* illustrates the arrangement of the three processors on a time division exchange loop with two disc files, as described above with reference to FIG. 1. Note that a control program, CP, and three application programs A, B, and C are stored on discs 16 and 18, respectively. This example illustrates how the control program in FIG. 3, which is currently on disc, is executed. Assume further that the program control instructions within this control program are those shown in FIG. 4. The first three program control instructions in FIG. 4 identify application programs A, B, and C for execution. An external request initiates the execution of the control program stored on disc; and as a result, this control program is brought into one of the processors by control program service. The control program is brought into processor 10 and now exists within the core of that processor. When the first program control instruction identifying the application program A is initiated, its count goes to zero and program A is ready for execution. Program A can be delegated to any of the processors in the center, and the delegation of work is accomplished basically in one of two ways. The program control instruction may specify the processor which receives the job, or the job may be assigned through a routing function. Each processor in the center has a routing service program and a routing table 90, as shown in FIG. 8*b*. The routing table 90 identifies the addresses of the processors within the center and causes jobs to be assigned sequentially to the various processors identified in the routing table. Routing service maintains a pointer for processor assignment. FIG. 8*b* shows that processor 12 will receive the next job in this example. Because program A is ready to be run, control program service will receive information from routing service that indicates processor 12 should receive program A. Thereafter, a service message is built and transmitted through the system communication channel to processor 12. The service message specifies that processor 12 is to execute application program A, and it enables processor 12 to locate the program. Although this request is queued at processor 12, the request is soon serviced, and the application program A is obtained from disc and brought into core for execution, as shown in FIG. 8*c*. Meanwhile, the routing table pointer is moved to identify processor 14 as the next processor to receive a job. Processor 12 executes application program A and transmits any data for A to its respective disc file. When processor 12 finishes with program A, it returns a service message to processor 10 specifying that it has completed the job requested. Control program service in processor 10 recognizes this return service message, gets the control program from disc, and updates the program control status and instructions.

Since program A has been completed, the count of steps B and C will be affected, as indicated in the execution list in FIG. 4. The counts for programs B and C are reduced by 1, resulting in a zero count and indicating that both application programs B and C can be initiated. Control program service consults routing service 90, which finds that processor 14 is to receive the next job as shown in FIG. 8*c*. Thus, a service message is built and sent through the system communication channel to processor 14, requesting the execution of application program B. As before, all requests are queued; however, processor 14 services the request, obtains program B from disc, and brings it into core for execution.

Figure 8E:
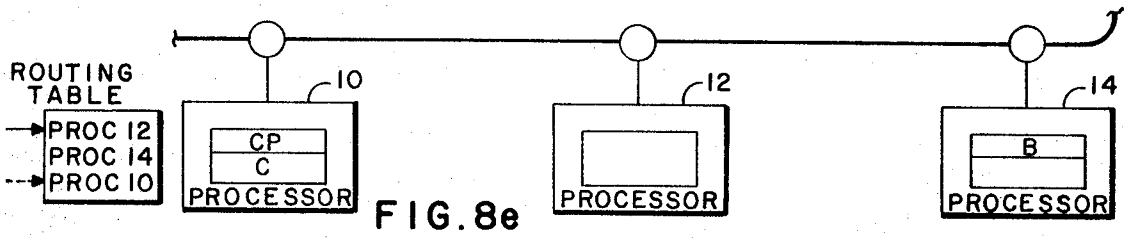

Meanwhile, the routing table is adjusted to point to processor 10 for the next job, as shown in FIG. 8*d*. Control program service notes that both programs B and C can be initiated (their counts are zero), and program C is assigned to processor 10 for execution. As shown in FIG. 8*e*, application program C is brought into the core of processor 10 and executed. Thus, two application programs from the same control program are running in parallel in separate processors. One of the major advantages of the method of implementing a programmable activity, in accordance with the present invention, is that orderly control is kept in terms of the sequence of jobs at all times; however, maximum utilization of the facilities results by delegating work across multiple processors disc files, tape units, printers, and other work stations. In this way, as many programs are run in parallel as the logic of job execution and physical facilities permit.

When processor 14 completes, it reports through the system communication channel and control program service updates the program control instruction list, since the execution list indicates in FIG. 4 that programs B and C affect the count of program D. When B is completed, the count of D is reduced from 2 to 1, and when program C is completed the count is reduced from 1 to 0, thereby indicating that D can be initiated. Program D does not start until both programs B and C are completed, thus it does not matter which one completes first. As soon as D is ready to be initiated, a service message is dispatched to the next entry in the routing table, which in this case is processor 12 as shown in FIG. 8*e*.

Any application program which runs and generates results to be used by other application programs, stores the results on a common file where it is accessible for other tasks. Any processor can read from any disc, though only one processor is given the space assignment and write capability for a given area on disc. This allocation of secondary storage space to each processor is a function of the operating software. Although FIGS. 8*a*–8*e* illustrate the control program in core of processor 1, control programs are maintained on disc and brought into processor core for interpretation and updating. They are not kept in core at all times, and multiple control programs can be running in the system throughout the various processors. Because several control programs can run in parallel, any processor in the system can call upon any other processor to assist in its work.

The operational control system in accordance with the present invention may be used to implement any directed flow activity. For example, it may be utilized in financial control systems which manage the total flow of money in areas such as cash receipts, disbursements, investments, taxes, insurance, accounting, and payroll. Similarly, the system may be used in production control systems which control the flow and operations on material in a sequential manufacturing activity.

In a printed circuit board production facility, for example, a maximum of about 20 work centers are required for the various activities such as pattern plating, photo resist masking and etching, hole drilling, laminating, silk screening, and the like. While several thousand varieties of printed circuit boards may be produced, depending on size, number of layers, and hole pattern, for example, perhaps only a dozen processes, or combinations of work stations, are required.

Thus, a control program is written for each of the processes with program control instruction addressed to each work station and identifying the task to be performed at the work station. Task identification is specifically tied to the particular part number in process.

Each task may require only manual operator execution, such as load, unload, move or inspection functions, or the task may be entirely machine implemented such as plating by automatic conveyer means or hole forming by numerically controlled drilling machines.

In such an application, only a single processor may be required to implement the control program and provide the communication and control function for the external work stations. Program status is maintained in the control program status record, as above described, in response to messages transmitted from the various work stations. Normally, these messages will indicate the initiation or completion of the assigned task, but the message may indicate a quantity change, task failure, or hold commands in the event of work station repairs, for example.

From the foregoing description, it is seen that the method of implementing a programmable activity by means of an automatic computing system has applicability in efficiently utilizing a multi-processor system or in employing a single processor in controlling a directed action network employing a plurality of work stations. While the invention has been described with reference to specific embodiments, the description is illustrative and not to be construed as limiting the invention. Various modifications and applications may occur to those skilled in the art without departing from the spirit and scope of the invention, as defined by the appended claims.

We claim:

1 In an automatic computing and processing system including a plurality of processor means, a plurality of data storage means, and a communication link interconnecting said processor means and said data storage means, the method of executing a directed action activity comprising the steps of:

a. establishing a control program for the execution of said activity including:
   a logical structure of said activity in terms of separate, well-defined tasks,
   a list and addresses of necessary stored inputs, desired outputs, and
   software services including other control programs, application programs and service programs. and
b. constructing and transmitting service messages on said communication link within said system for implementing said tasks concurrently in time-ordered sequence, said service messages providing work stations with required data and software services and updating the status of said control program as said tasks are completed.

2. The method defined by claim 1 wherein said control program established in step (a) includes a plurality of program control instructions each defining a task and including task identification, input requirements, and interconnection and control information.

3. The method defined by claim 2 wherein at least one program control instruction defines a plurality of sub-tasks with one sub-task chosen from the group consisting of service programs, application programs, and control programs.

4. In an automatic computing and processing system including a plurality of processor means, a plurality of data storage means, and a communication link interconnecting said processor means and said data storage means, the method of executing a multitask activity comprising the steps of:

a. defining a plurality of service programs, application programs and control programs for effecting directed action activity and storing said programs in said data storage means,
b. providing to a first processor means a control program defining the tasks of said multitask activity as program control instructions,
c. performing said program control instructions in time-order sequence by
   1. assigning each program control instruction to a processor means,
   2. obtaining from said plurality of data storage means any programs and data required by each of said program control instructions,
   3. running said programs,
   4. recording the results of completed program control instruction, and
   5. returning to said data storage means each of said programs when completed, and
d. maintaining the status of said multitask activity within said first processor means.

5. The method of executing a multitask activity as defined by claim 4 wherein step (c) includes:

assigning each program control instruction a sequence index which is dependent on the status of preceding program control instructions the performance of which are conditions precedent to the performance of said each program control instruction, decrementing said sequence index as said preceding program control instructions are completed, and assigning each program control instruction to a processor means when said sequence index indicates all of said preceding program control instructions are completed.

6. The method of executing a multitask activity as defined by claim 4 wherein said control program of step (b) comprises a control program status record including system compatible identification, activity status, related activity identification, input data, and program control instructions for performing each task.

7 The method of executing a multitask activity as defined by claim 6 wherein said program control instructions include status and control information, identification, output instructions, an input parameter list, an execute parameter list, and a release parameter list.

8. The method of executing a multitask activity as defined by claim 7 wherein at least one program control instruction includes a plurality of programs and step (c) includes performing said plurality of programs in time-order sequence.

9. The method of executing a multitask activity as defined by claim 8 wherein sub-step (3) of step (*c*) includes controlling external work stations through means of a second communication link interconnecting said external work stations and a processor means.

10. The method of claim 4 wherein sub-step (3) of step (*c*) includes controlling external work stations through means of a second communication link interconnecting said external work stations and a processor means.

* * * * *